United States Patent Office 3,047,994
Patented Aug. 7, 1962

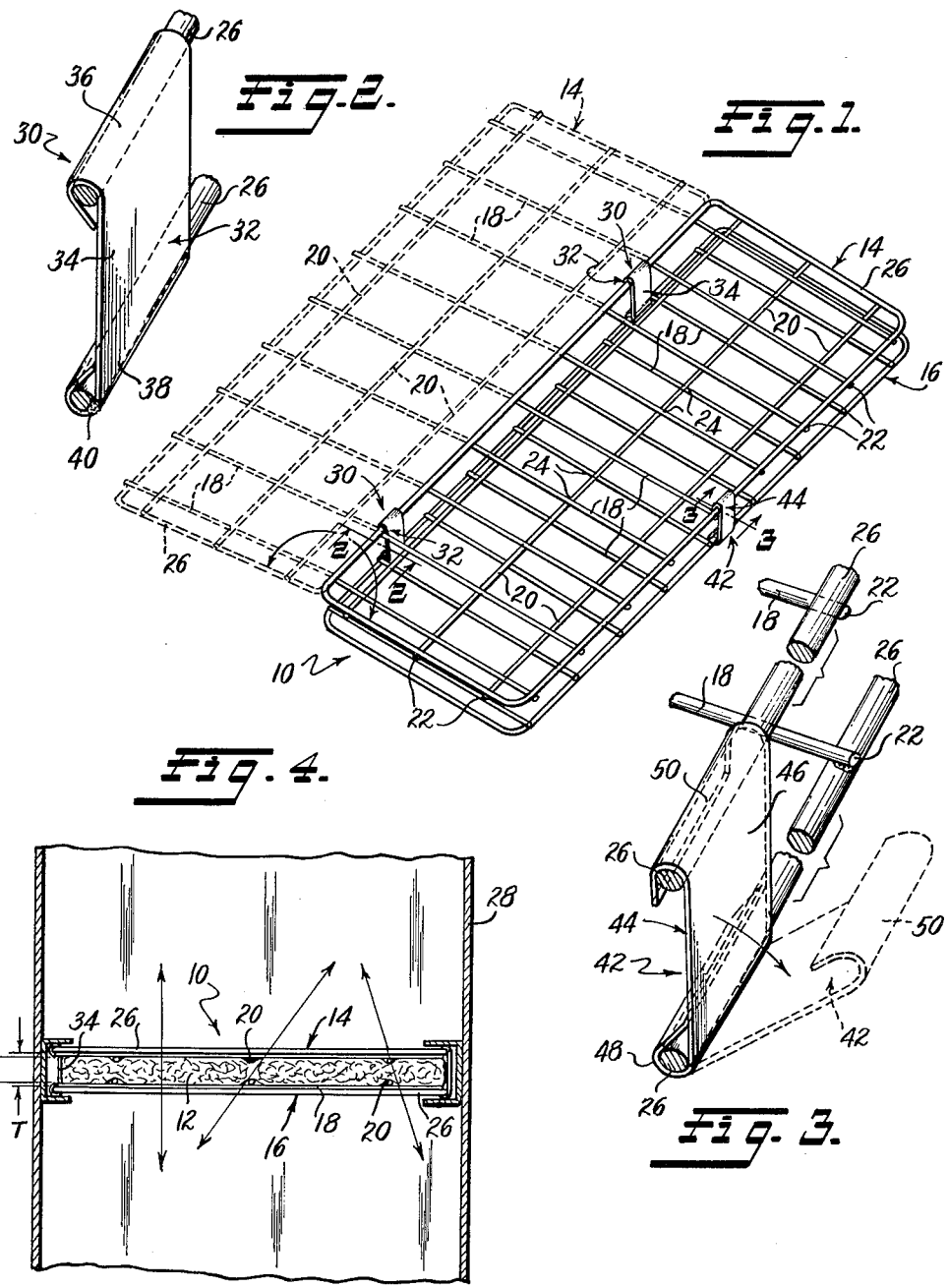
INVENTOR.
George K. LeBrun

3,047,994
FILTER
George K. Le Brun, Bethesda, Md., assignor to National Refill Company, Inc., Brandywine, Md., a corporation of Maryland
Filed Dec. 4, 1959, Ser. No. 857,305
1 Claim. (Cl. 55—493)

This invention relates to filters and more particularly to an improved supporting device for removably supporting filter media.

In the past, most filters which are of the permanent and/or reusable type include a rigid frame structure and a resilient spring-like member which cooperates with the frame structure for removably retaining the filter media therein, or in filters which do not include a resilient spring-like member, the filter structure includes several separate and independent elements which must be secured together in some manner in order for the filter structure to support the filter media.

Further, in most instances, known types of filters also require that the filter media, when supported by the supporting structure, be placed into the conduit or duct of the associated equipment in a definite manner so that such filter media will not be inadvertently separated from the supporting structure by the movement of gases therethrough. In other words, known filters require care in positioning the filter structure in operational relationship to the equipment with which the filter is being used, and if such known filters are placed in reverse position relative to the desired position, the result is that the filter media is removed from the supporting structure and blown into the equipment which results in damage thereto and no filtering effect is acquired by the remaining frame structure.

Accordingly, it is the primary object of this invention to provide an improved filter media supporting device wherein the supporting device is effectively operable to support the filter media so that gases may pass transversely through the filter media from a plurality of opposite directions without removing the filter media from the supporting structure.

Another object of this invention is to provide an improved supporting device for filter media which is of unitary construction having no readily separable parts so that assembly of the filter media within the confines of the suporting device does not necessitate the securement of a plurality of separable parts which are basically independent of each other together.

An additional object of this invention is to provide an improved filter media supporting device which, when operably supporting the filter media, defines a substantially uniform supoprting surface which substantially equally supports the filter media and engages same so that such filter media is substantially equally compressed with the density thereof remaining substantially constant throughout the full extent of the filter area thereof.

A further object of this invention is to provide an improved supporting device for supporting filter media which is inexpensive to manufacture, durable in use and reliable in operation.

In order to accomplish the desired objects and overcome the disadvantages, as stated above, the invention comprises an improved supporting device for supporting filter media wherein the resulting filter is a permanent and/or reusable type as used in ducts or conduits of equipment such as air conditioning units, heating systems, etc. The supporting structure which supports the filter media in the desired position relative to the equipment with which the filter is being used includes a pair of generally rectangular relatively rigid wire frame members which are each of substantially like configuration and disposed enantiomorphously when in an operative filter media supporting position. Each of the wire frame members includes generally laterally and longitudinally extending elongated wire sections which are interconnected to define an apertured supporting surface for engaging opposed surfaces of the filter media. Further, each of the wire frame members has an endless continuous wire that interconnects the end portions of each of the transversely and longitudinally extending wire sections with the endless wire being disposed adjacent the periphery of the respective supporting surface to define the lateral and longitudinal confines thereof. The frame members are pivotally connected together as a unit along one common longitudinally extending edge portion of the supporting device by pivot means which enables one of the frame members to pivot relative to the other frame member between a first position wherein the frame members are disposed in respective planes which are substantially parallel so that the filter media may be supported therebetween and a second position wherein the frame members are disposed to enable the filter media to be readily removed therefrom in order to replace, repair, clean or perform any other necessary operation thereto. The frame members are further rigidly spaced and connected to each other along the one longitudinal edge portion of the supporting device by spacer means which continuously maintains the adjacent longitudinal edge portions of the frame members a definite, desired and given distance apart during the pivotal movement of the one frame member. In addition to being pivotally connected and rigidly spaced as a unit by the pivot and spacer means, there is provided positioning means which continuously maintains the spacer means and the pivot means in the desired relative position so that the unitary supporting device will maintain the desired rigidity during the operation thereof. There is also provided latch means for releasably securing the frame members together in the above mentioned first position wherein the filter media is supported in the first or operative position. The latch means is disposed along the longitudinally extending edge portion of the supporting device that is laterally opposed to the one longitudinally extending edge portion thereof with the latch means being carried by one of the frame members and operable to be releasably connected to the other frame member.

Other objects, advantages and important features of the invention will be apparent from a study of the specification following taken with the drawing which together describe, disclose and illustrate a preferred embodiment of the invention and what is now considered and believed to be the best mode of practicing the principles thereof. Other embodiments may be suggested to those having the benefit of the teachings herein, and such other embodiments are intended to be reserved especially as they fall within the scope and breadth of the subjoined claim.

In the drawing:

FIGURE 1 is an isometric view of the improved supporting device for filter media illustrating such supporting device in a first or filter media supporting operative position in solid lines and a second position wherein such filter media may be easily removed, FIGURE 2 is an enlarged partial view of FIG. 1, taken along the line 2—2 looking in the direction of the arrows, and more clearly illustrating the pivot-spacer-positioning means of the improved supporting device, FIGURE 3 is an enlarged partial view of FIG. 1, taken along the line 3—3 looking in the direction of the arrows, and more clearly illustrating the latch means of the improved supporting device, and FIGURE 4 is a side elevational view illustrating the improved supporting device, having filter media supported thereby, operatively positioned within the confines of a duct or conduit.

Attention is now directed to the drawing wherein there is illustrated an improved supporting device 10 for supporting filter media 12 which may be either of throw away or washable type material. As shown in FIG. 1, the supporting device 10 includes a pair of generally rectangular wire frame members 14—16 which are each formed from sections of relatively rigid non-corrosive wire and it is to noted that the wire frames 14—16 are each defined by a plurality of generally laterally extending elongated wire sections 18 and generally longitudinally extending elongated wire sections 20, each of which terminates in free end portions 22. The wire sections 18 and 20 are interconnected at junctures 24 in a suitable manner, such as spot welding, with the laterally extending wire sections 18 being positioned relative to the respective laterally extending wire sections 20 in a direction that is toward the filter media 12. Each of the frame members 14—16 is provided with an endless continuous wire 26 which connects the free end portions 22 of the wire sections 18 and 20 together to define the lateral and longitudinal confines of a relatively rigid apertured supporting surface which engages the adjacent surface of the filter media 12 when the supporting device 10 is in the operative position, as illustrated by the solid lines of FIG. 1, with the respective frame members 14—16 being disposed enantiomorphous with the filter media 12 therebetween.

In the operative position, as shown by the solid lines in FIG. 1, it is to be noted that the filter media 12 will be substantially equally supported throughout the full filter area or extent thereof between the supporting surfaces defined by the respective frame members 14—16 with the supporting force exerted thereby being substantially uniform throughout the effective filter area of the filter media 12 and that the compression due to the supporting force created by the frame members 14—16 on the respective adjacent surfaces of the filter media 12 is substantially equal throughout the effective filter area of the filter media 12 with the density thereof being maintained substantially constant. Further, it is also to be noted that the filter effect acquired through the filter area of the filter media 12, when so supported, will be effective on gases moving in any direction which may be generally transverse through the filter media 12 so that on placing of the filter supporting device 10 having the filter media 12 supported thereby into a conduit or duct 28, note FIG. 4, of an air conditioning apparatus, heating system or the like, not illustrated, that the filter effect will be substantially equal for any gases which may be passing through the filter media 12 in directions as illustrated by the double-headed arrows in FIG. 4.

The frame members 14—16 are rigidly spaced and pivotally connected in a unitary manner to each other along a common longitudinally extending edge portion of the supporting device 10 by spacer-pivotal-positioning means 30 in the form of a plurality of C-shaped clip elements 32. As more clearly illustrated in FIG. 2, each of the C-shaped clip elements 32 is disposed so as to open generally laterally outwardly away from the filter media 12 and are each of substantially like configuration having substantially flat smooth surfaced bite portions 34 which terminate in curved substantially cylindrical end portions 36—38 which engage the immediately adjacent endless wires 26 of the frame members 14—16 respectively. The substantially flat rigid bite portions 34 of the C-shaped clip elements 32 define spacer means which rigidly space the adjacent longitudinally extending edge portions of the frame members 14—16 from each other a definite desired given distance D which is less than the thickness T of the filter media 12 so that when the frame members 14—16 are in the operative position the filter media 12 will be snugly and firmly maintained in a desired position so that any movement of gases through the filter media 12 will not cause any vibrations to the filter media which would result in a separation of collected impurities which may have been trapped therein.

The substantially cylindrical portions 36 of the C-shaped clip elements 32 each engage the peripheral endless wire 26 of the frame member 14 at longitudinally spaced locations thereon and define therewith pivot means which enables the frame member 14 to be pivotally movable between the operative or first position, illustrated by solid lines in FIG. 1, wherein the filter media 12 may be operatively supported within the confines of the supporting device 10 and a second position, illustrated by the dot-dash lines of FIG. 1, which enables the filter media 12 to be removed, replaced, repaired, cleaned, or handled in any other way as desired.

It is to be noted that, in the first position as described above, the wire frame members 14—16 are positioned in respective planes which are disposed substantially parallel and that in the second position such planes are disposed so that if the respective planes were each extended, such extensions would intersect each other.

In order to maintain the desired rigidity and spacing between the adjacent longitudinally extending edge portions of the wire frame members 14—16 along the one common edge of the supporting device 10, each of the substantially cylindrical end portions 38 of the C-shaped clip elements 32 is secured to the peripheral endless wire 26 of the frame member 16 at longitudinally spaced locations thereon by suitable means 40, such as spot welding or the like, so that during the pivotal movement of the frame member 14 relative to the frame member 16 the adjacent longitudinally extending portions of each of the peripheral endless wires 26 which extend along the one edge portion of the supporting device 10 is rigidly maintained in the desired spaced relationship by the spacer means 34 and the pivot means 36.

In order to maintain the frame members 14—16 in the first or operative position, described above, and also to enable the frame member 14 to be pivotally movable into and out of the second position, also described above, releasable latch means 42 is provided which releasably secures the frame members 14—16 together in the first position. The latch means 42, as provided in the instant embodiment of the invention, comprises a substantially C-shaped clip element 44 which is of substantially like configuration to the C-shaped clip elements 32 but which differs therefrom by being disposed so that the C-shaped clip element 44 opens laterally inwardly toward the filter media 12. The C-shaped clip element 44 is provided with a bite portion 46 which terminates in substantially cylindrical end portions 48—50 and, as illustrated, the cylindrical end portion 48 is permanently pivotally connected about the peripheral wire 26 of the wire frame member 16 so that the bite portion 46 and cylindrical end portion 50 thereof may be pivoted to enable the cylindrical end portion 50 to snugly engage, by a snap-like action, the peripheral wire 26 of the frame member 14. The latch means 42 is disposed along a longitudinally extending edge portion of the supporting device 10 that is opposed to the one common longitudinally extending edge portion thereof along which the C-shaped clip elements 32 are positioned. While the latch means 42 has been described, disclosed and illustrated as being pivotally mounted to the endless wire 26 of the frame member 16 by the cylindrical end portion 48 with the other cylindrical end portion 50 defining the releasable snap-like connection to the endless wire 26 of the frame member 14, it is to be understood that such conditions may be reversed with the latch means 42 being pivotally carried by the endless wire 26 of the frame member 14.

Similarly, it is to be understood that the unitary connection of the frame members 14—16 together by the spacer-pivotal-positioning means 30 may also be reversed by providing the positioning means 40 between the spacer means 34 and the frame member 14 instead of between the spacer means 34 and the frame member 16 and then provide the pivot means 36 between the spacer means 34 and the frame member 16. However, in the preferred embodiment it is desirable that the lower frame member, which as illustrated is the frame member 16, be the frame member to which the spacer-pivotal-positioning means 30 is rigidly positioned and maintained substantially perpendicular, in the normal relationship, relative to the planes of the respective frame members 14—16 when disposed in the first position so that on placing the filter media 12 into the supporting device 10 an edge of the filter media will engage the substantially flat smooth bite portions 34 and 46 of the C-shaped clip elements 32 and 44 to position the filter media in proper relationship within the confines of the supporting device 10.

From the description and disclosure as stated above, it is believed that the filter supporting device 10 defines a unitary supporting structure for the filter media 12 and enables the filter media 12 to be placed in operative position, for example, within the duct or conduit 28, without the necessity of paying specific attention to the position of the filter relative to the direction or flow of gas and that when the filter is so positioned the filter media 12 is supported in a manner which is substantially uniform with the filter media 12 being substantially equally compressed and having a substantial constant density throughout the full extent of the filter area thereof.

While the invention has been described in terms of an embodiment which it has assumed in practice, the scope of the invention should not be deemed to be limited by the precise embodiment herein shown, illustrated, described and disclosed, and it is to be understood that other such embodiments are intended to be reserved, especially as they fall within the scope of the claim herein appended.

I claim as my invention:

A filter media supporting device including a pair of generally rectangular relatively rigid perforated frame members of substantially like configuration which define a pair of filter media supporting surfaces of substantially equal area and extent, each of said frame members including generally laterally and longitudinally extending elongated wire sections and an endless wire connecting the end portions of the elongated wire sections together to define the lateral and longitudinal marginal extent of the respective filter media supporting surface, pivot-spacer means including a plurality of generally C-shaped clip elements disposed in spaced relationship relative to each other along only one longitudinal edge portion of the supporting device, each of said C-shaped clip elements having a substantially flat portion disposed intermediate substantially cylindrical end portions with one of the cylindrical end portions of each C-shaped clip element being pivotally connected to the endless wire of one of the frame members to define pivot means which enables pivotal movement of the one frame member relative to the other frame member between a first position wherein the frame members are disposed in respective planes which are substantially parallel to freely support a filter media therebetween and a second position wherein the frame members are disposed in positions relative to each other to permit such filter media to be readily removed therefrom, securing means for rigidly connecting each of the other cylindrical end portions of the C-shaped clip elements to the endless wire of the other frame member for continuously maintaining the flat intermediate portions of the C-shaped clip elements disposed generally perpendicular relative to the respective planes of each frame member when in the first position during pivotal movement of the one frame member, said flat intermediate portions of the C-shaped clip elements defining spacer means for continuously spacing the frame members a given distance apart along the one edge portion of the supporting device during pivotal movement of the one frame member and for confining such filter media between the supporting surfaces of the frame members within the lateral and longitudinal marginal extent thereof, and a single latch means disposed along an edge portion of the supporting device that is opposed to the one edge portion thereof and pivotally mounted on said other frame member for releasably securing the endless wires of the frame members together when the frame members are in the first position.

References Cited in the file of this patent

UNITED STATES PATENTS

| | | |
|---|---|---|
| 1,544,690 | Shurtleff | July 7, 1925 |
| 1,699,899 | Little | Jan. 22, 1929 |
| 1,728,140 | Steuer | Sept. 10, 1929 |
| 1,887,737 | Shurtleff | Nov. 15, 1932 |
| 2,057,568 | Gerard | Oct. 13, 1936 |
| 2,138,736 | Gaarder | Nov. 29, 1938 |
| 2,182,501 | Quave | Dec. 5, 1939 |
| 2,685,345 | Linder | Aug. 3, 1954 |
| 2,789,663 | Camp | Apr. 23, 1957 |